United States Patent [19]

Bass

[11] 4,423,850

[45] Jan. 3, 1984

[54] FINE ADJUSTING MECHANISM FOR A LEVEL PLATFORM

[75] Inventor: Alva W. Bass, Arab, Ala.

[73] Assignee: The United States of America as represented by the Secretary of the Army, Washington, D.C.

[21] Appl. No.: 293,580

[22] Filed: Aug. 17, 1981

[51] Int. Cl.³ .......................................... F16M 11/14
[52] U.S. Cl. ................................... 248/181; 248/288.5
[58] Field of Search ...................... 248/288.5, 181, 180, 248/481; 403/90

[56] References Cited

U.S. PATENT DOCUMENTS

| | | | |
|---|---|---|---|
| 1,883,796 | 10/1932 | King | 248/181 |
| 1,894,456 | 1/1933 | Zerk | 248/181 |
| 3,774,584 | 11/1973 | Paulson | 248/181 X |

Primary Examiner—Ramon S. Britts
Assistant Examiner—Sarah A. Lechok
Attorney, Agent, or Firm—Robert P. Gibson; Anthony T. Lane; Harold W. Hilton

[57] ABSTRACT

A mount for mounting a device which must be leveled. Such a device may be a ground located laser designator apparatus which is used for illuminating a target at which missles are fired.

The mount allows the Ground Located Laser Designator (GLLD) to be mounted on both wheeled and tracked vehicles. Vehicle mounting the GLLD requires a leveler assembly capable of leveling to an accuracy of ±0.5 mr over a range of ±15°.

This invention is directed to a device capable of rapid precision leveling over large angular variations.

3 Claims, 8 Drawing Figures

FINE ADJUSTING MECHANISM FOR A LEVEL PLATFORM

DEDICATORY CLAUSE

The invention described herein may be manufactured, used, and licensed by or for the Government for governmental purposes without the payment to me of any royalties thereon.

BACKGROUND OF THE INVENTION

The mount for the Ground Locater Laser Designater (GLLD) incorporates a leveler platform which is leveled roughly by eye, then locked in position. Lock-up in position is accomplished by clamping a ball socket joint using screw threads. A captive locking plate is used to adjust the preload on the ball socket joint.

This invention relates to an improved means of adjusting the locking plate by incorporating teeth around the periphery of the locking plate and an access or leverage hole which permits a common prying tool such as a screwdriver to turn and adjust the locking plate to apply the proper preload to the ball socket joint.

SUMMARY OF THE INVENTION

A leveler platform which is leveled roughly and quickly by eye then locked into position. The leveler includes a housing enclosing a locking plate having a locking cap in threaded relation therewith. A support ball, mounted in a base assembly which is secured to a vehicle, is securely compressed by the locking cap by adjustment of the locking plate by engaging teeth on the periphery thereof by a screwdriver, or the like.

BRIEF DESCRIPTION OF THE DRAWINGS

As seen in FIG. 1 the leveler assembly 10 is mounted on a vehicle generally illustrated at 12. The leveler assembly typically would support a ground level laser designator on an upper support member 14. The ground level designator has been deleted for clarity.

The leveler includes a support housing 16 secured to a lower support member 18 and upper support member 14.

Figure 5:
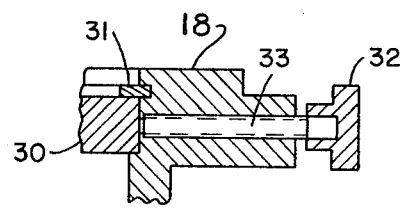
FIG. 5 is a sectional view along line 5—5 of FIG. 2.
Figure 3:
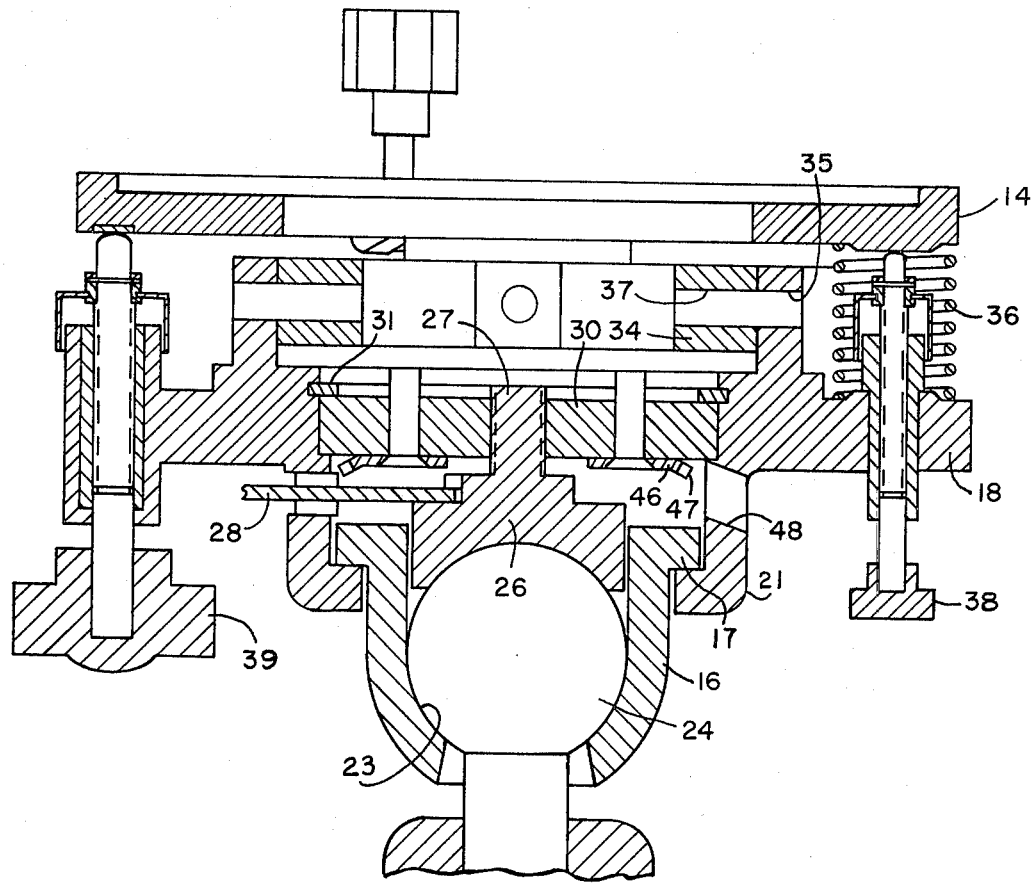
FIG. 3 is a sectional view along line 3—3 of FIG. 2.
Figure 4:
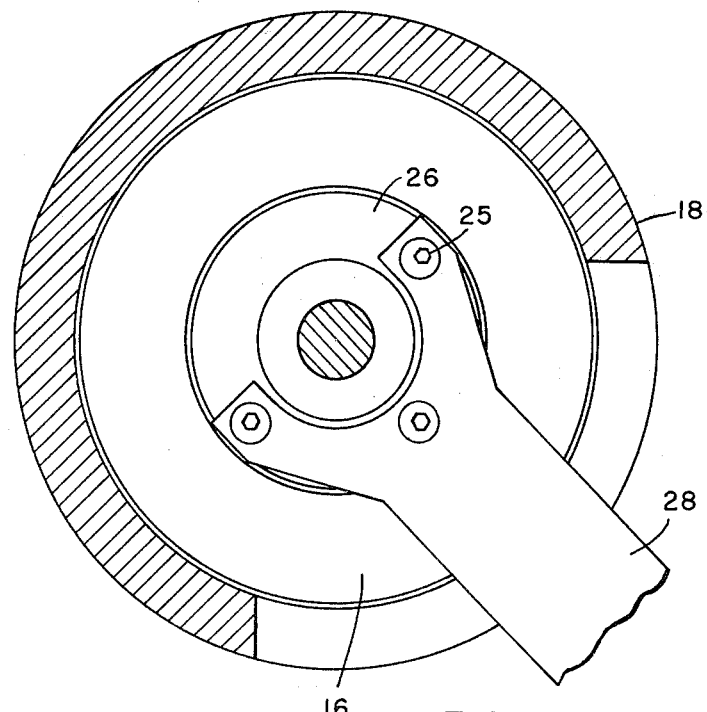
FIG. 4 is a partial sectional view of the locking lever of the assembly.

The GLLD (not shown) is mounted on the leveler assembly at surface 14 and secured by three swing bolt assemblies 19. The leveler assembly is attached to a pedestal 20 of the universal mount by a support ball shaft and a nut (not shown). The leveler support is provided by a support ball 24 which extends into housing 16 and rests against the inner surface 23 thereof. The leveler is secured to the ball by a clamping force exerted by a locking cap 26 and support housing 16. Clamping force is applied by rotating a locking handle 28 (FIG. 4) which is attached to locking cap 26 by screws 25. Locking cap 26 (FIG. 3) has a threaded stud 27, and, as locking handle 28 is rotated, locking cap 26 will either apply or release clamping force on support ball 24 and between an outwardly extending annular flange 17 provided on housing 16 and inwardly extending annular flange 21 provided on lower support member 18. Locking cap stud 27 engages locking plate assembly 30. Locking plate assembly 30 can be rotated to adjust clamping force applied by cap 26 on support ball. Locking plate assembly 30 is held in place by retaining ring 31 and locking screw assembly 32. Locking screw assembly 32, shown in FIG. 5, includes a threaded shaft 33 which extends through support member 18 and into engagement with leveling plate 30. This is done to set the plate in proper position during assembly of the leveler prior to field use of the leveler.

A two axis gimbal is formed by lower support member 18, a gimbal mount 34, upper support member 14 and dowel pins (not shown) which extend through openings 35 and 37 in support member 18 and gimbal 34, respectively. A pair of leveling screws 38, spaced 90° apart, is provided with springs 36 which force the upper support member 14 to maintain contact with leveling screws 38 at all times. Leveling screws 38 are rotated to adjust the level of upper support member 14 during fine leveling of the device. A pair of locking screws 39, spaced 90° apart are provided to maintain support member 14 in place after adjustment of screws 38.

A circular bubble level may be mounted in lower support member 18.

The device of this invention provides for tightening and adjusting the locking plate 30 so that the locking handle 28 works properly and in a facile manner in the field.

Figure 1:
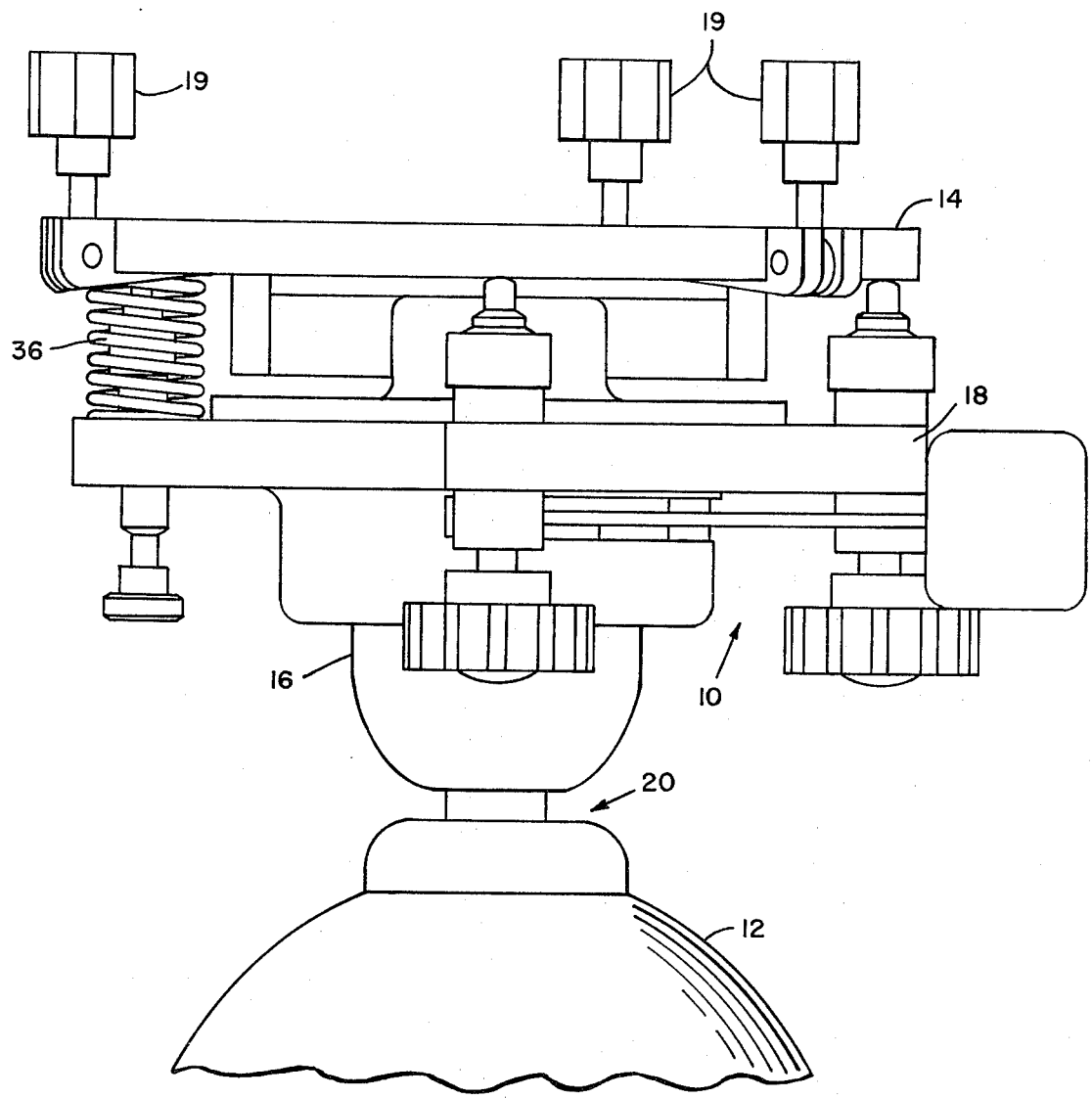
FIG. 1 is an elevational view of the leveler assembly mounted on a vehicle.
Figure 6:
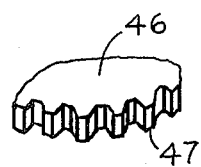
FIG. 6 is a partial pictorial view of the locking plate assembly of FIG. 3 illustrating teeth on the periphery thereof.
Figure 7:
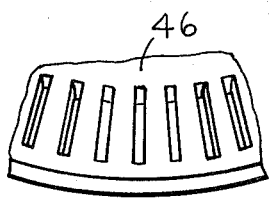
FIG. 7 is a view similar to FIG. 6 illustrating the locking plate assembly having a notched surface.
Figure 8:
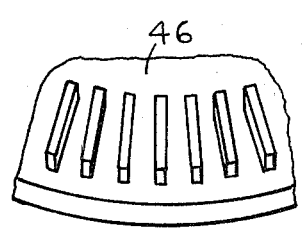
FIG. 8 is a view similar to FIG. 6 illustrating the locking plate assembly having raised portions thereon.
Figure 2:
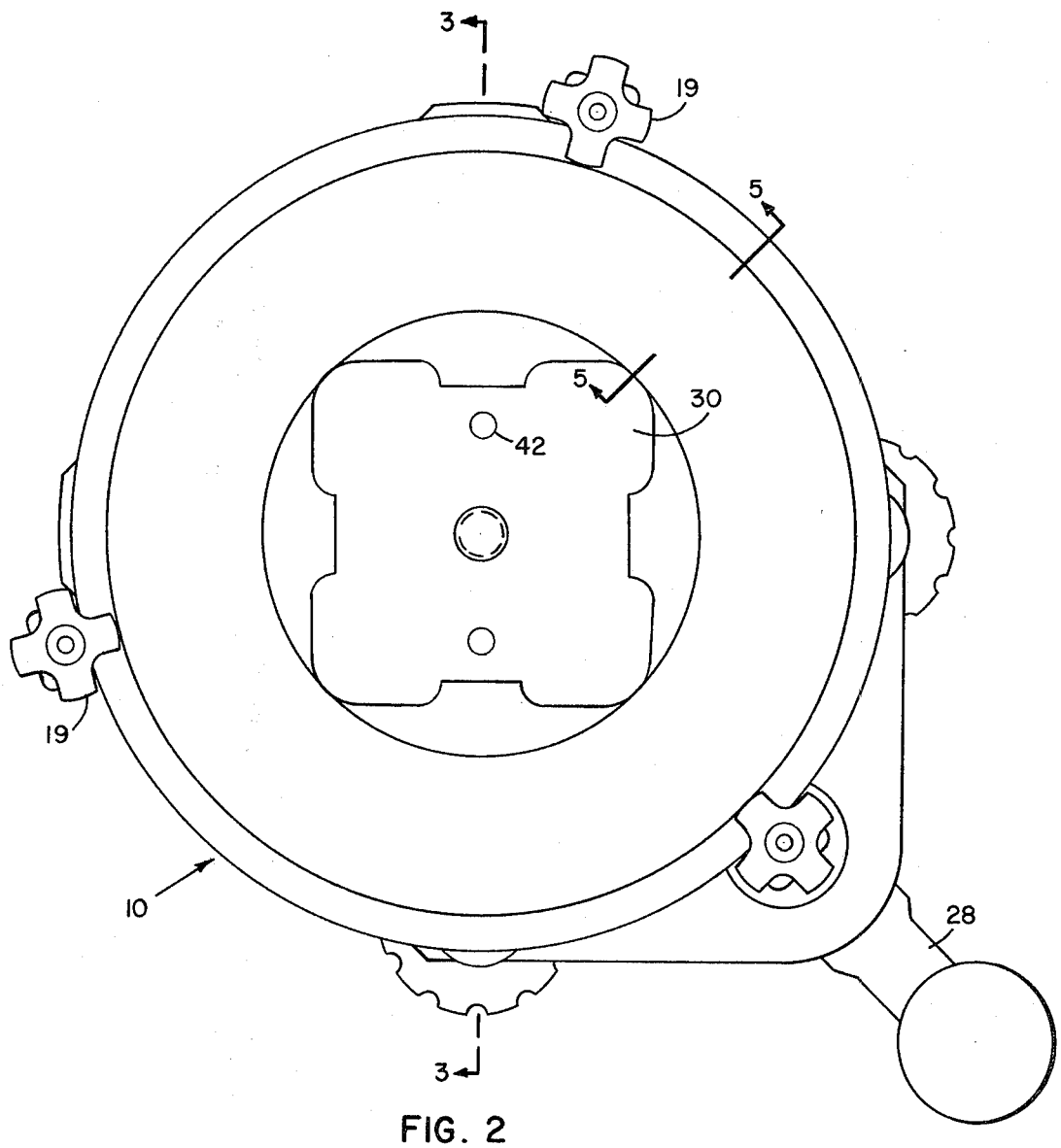
FIG. 2 is a plan view of the leveler assembly.

The locking plate 30, during assembly of the leveler unit, is screwed onto the locking cap 26 by holding and turning two pins 42 (FIG. 2) on the locking plate 30 sufficiently to seat the locking plate 30 on the shoulder in the lower support member 18 permitting retaining ring 31 to be installed.

During assembly the locking plate 30 is turned for fine adjustment by an adjusting plate 46 having teeth 47 on the periphery thereof which is attached to the bottom of the locking plate 30, or teeth are added to the bottom of the locking plate 30 and an access hole 48 for a prying tool is provided in the lower support member 18 adjacent to the periphery of the adjusting teeth.

Now, precise adjustment using any common screwdriver type prying tool can be easily accomplished. The nearness of the adjusting teeth to the edge of the prying tool hole allows a high leverage ratio which in turn permits ease and precision of adjustment even though frictional resistance is high in the final adjustment stage. All of the above is done during assembly of the device, prior to the assembly being used in the field so that, once in the field the leveler assembly may be quickly set up for use.

In operation the vehicle is parked on slopes up to 15° and the GLLD is secured to upper support member. The GLLD is leveled to within ±1° by releasing the locking handle and manually leveled by maneuvering the leveler assembly and observing the circular level. When level, lock in place. The GLLD is now leveled to within ±1°. The GLLD is precision leveled to ±0.5 mr using leveling screws 38, and observing the precision bubble level mounted on the GLLD. When the GLLD is leveled it is locked in place using the two locking screws 39.

I claim:

1. A platform for support of an item to be leveled comprising:
    a. a pedestal;
    b. a housing having an outwardly extending annular flange, said housing connected to said pedestal;
    c. means for connecting said housing to said pedestal including a shaft having a ball on its distal end extending into said housing for engaging relation with the lower internal surface thereof;
    d. a lower support member supported on said housing, said lower support member having an inwardly extending annular flange for bearing engagement with said outwardly extending annular flange of said housing;
    e. a locking plate secured to said support member, said locking plate having a notched surface;
    f. a locking cap secured in threaded relation with said locking plate having a curved lower surface for receiving said ball therein;
    g. a locking handle secured to said locking cap adapted to rotate said locking cap relative to said locking plate for engaging said ball and clamping said annular flanges; and
    h. said housing including an opening for receiving a prying tool for engagement of said notched surface for rotation of said locking plate relative to said locking cap for fine adjustment of the position of said locking cap with respect to said ball.

2. A platform as in claim 1 wherein said notched surface is formed by teeth secured to said locking plate.

3. A platform as in claim 1 wherein said notched surface is formed by raised portion on said locking plate.

* * * * *